Nov. 19, 1940.  H. C. LE BEAU, JR  2,221,921
METHOD OF APPLYING SEAT RINGS TO VALVE BODIES
AND VALVE BODIES PRODUCED THEREBY
Filed Aug. 24, 1938    2 Sheets-Sheet 1
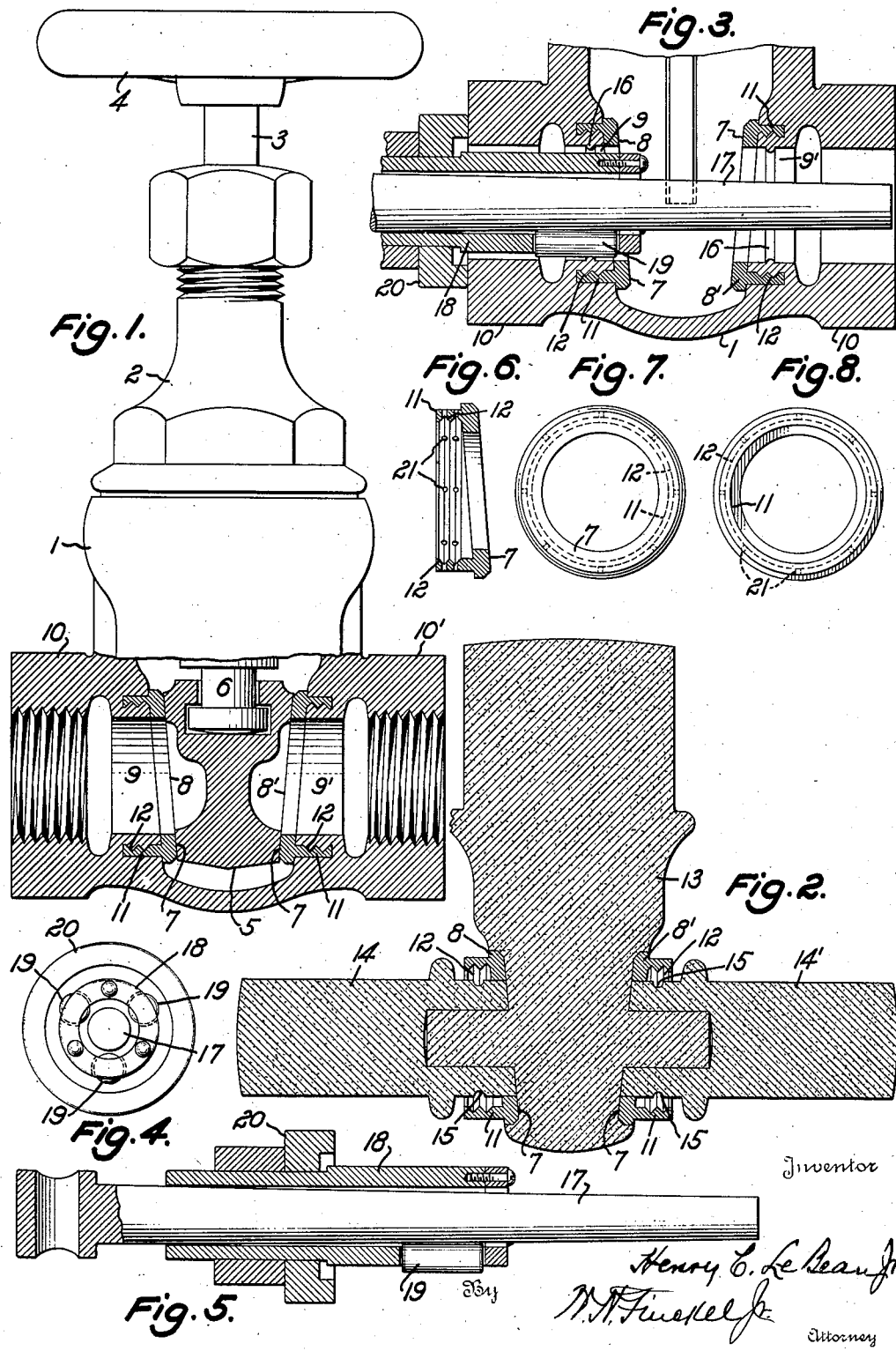

Nov. 19, 1940.
H. C. LE BEAU, JR
2,221,921
METHOD OF APPLYING SEAT RINGS TO VALVE BODIES
AND VALVE BODIES PRODUCED THEREBY
Filed Aug. 24, 1938
2 Sheets-Sheet 2
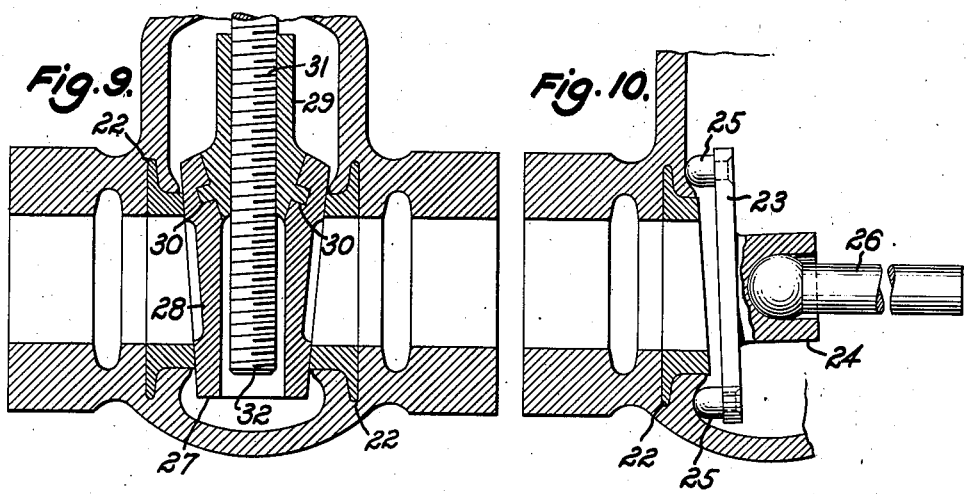
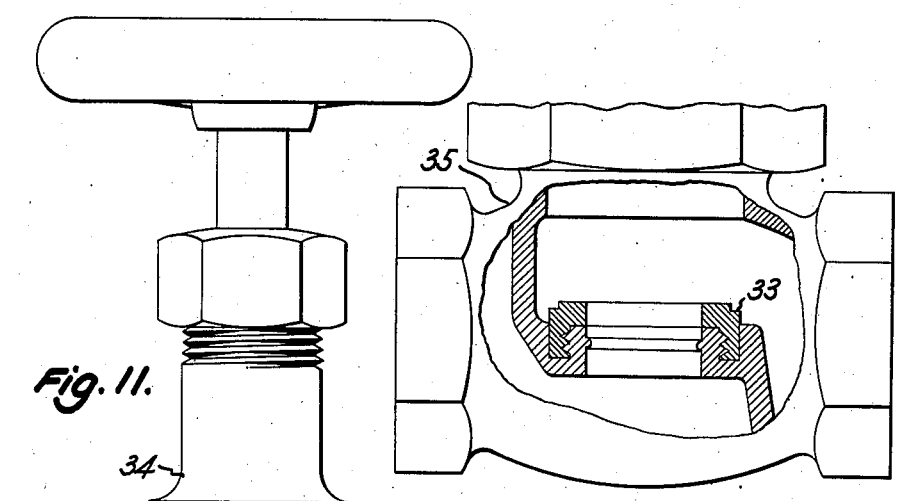
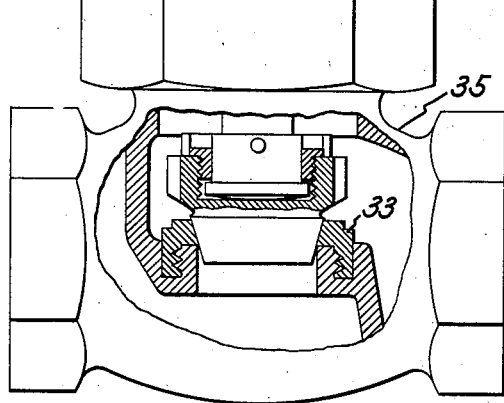

Patented Nov. 19, 1940

2,221,921

UNITED STATES PATENT OFFICE 2,221,921

METHOD OF APPLYING SEAT RINGS TO VALVE BODIES AND VALVE BODIES PRODUCED THEREBY

Henry C. Le Beau, Jr., Wadsworth, Ohio, assignor to The Ohio Injector Company, Wadsworth, Ohio, a corporation of Ohio Application August 24, 1938, Serial No. 226,547

9 Claims. (Cl. 29—157.1)

Various expedients have been resorted to for providing numerous types of valves with seat rings and other seating members of a metal dissimilar to that from which the valve bodies and associated parts are made.

Usually a harder metal, or a metal of denser structure and greater wear-resisting properties is chosen for the seat rings or inserts than that of which the valve body and associated parts are made. For example, steel or hard and tough alloy rings and inserts have been employed in cast iron, brass and bronze bodies.

The mode of applying the seat rings or inserts to the valve bodies and their parts ordinarily falls within two classes, viz. that in which the seat ring or insert of dissimilar metal is cast integral with the valve body or part; and that in which the seat ring or insert is mechanically connected with the valve body or part, as by screw-threaded engagement or the like.

So far as is now known, each of these modes is subject to imperfections in a practical sense. Where, heretofore, the seat ring or insert has been cast integral with the valve body or its part, the dissimilarity of the metals of the two and their concomitant differences in physical properties, especially their respective coefficients of expansion, have made the production of an intimate union between them, during the casting process, impossible, the result being that the connection is initially insecure and not fluid-tight, or develops these characteristics in use; and where mechanical connections are resorted to, the machining and assembling operations necessary in the production of such mechanical connections, and in the assembly of the parts entail manufacturing costs out of proportion to the results attained. Moreover, the mechanical connections are unsatisfactory because of the likelihood of their becoming loose in service with resultant ineffective functioning of the valves.

Some stress has been laid upon the advantage obtained by the provision of valve inserts or seat rings of the mechanically connected type in that they are capable of replacement, but their initial cost, and their liability to failure in service, has been found to more than offset any material advantage in this respect.

Thus, except insofar as valves in the large size range are concerned, integrally cast inserts or seat rings may be considered to be the most practical from the standpoints of both manufacture and service, if means can be provided for obtaining a proper union and fluid-tight connection between them and the valve parts in which they are employed.

It is the object of this invention to provide valve bodies and parts having wear-resisting inserts or seat rings which may be associated with the valves during the casting operation, and to provide a method for so uniting the inserts or seat rings with the valve bodies or parts as to afford an intimate, rigid and fluid-tight assembly, and an effective mechanical union.

It has been found that the copper-nickel alloy, commercially known as "Monel" metal, is well suited to the purpose of furnishing valve inserts and seat rings in accordance with the invention, particularly where such inserts or seat rings are employed in valve bodies and parts made of brass or bronze, in that its melting point is much higher than that of the body metal, and that when heated by the body metal during the casting process, its characteristics of toughness and hardness, and its wear-resisting properties will not be lost upon cooling of the casting, because it hardens as it slowly cools, instead of requiring the customary quenching to harden it. Hence, as the casting, including the seat ring is permitted to cool slowly in the mold, the seat ring, as it cools, will harden.

Moreover, if found necessary for machining, or to eliminate characteristics of uneven hardening, the seat ring or insert may be annealed by heating to its annealing temperature, which is below the melting temperature of the body metal, and then quenched. And it may thereafter, if desired, again be hardened by heating to its hardening temperature, which also is below the melting point of the body member, and slowly cooling.

Although Monel metal has been found to be eminently satisfactory for use in the provision of valve inserts and seat rings in accordance with the invention, it will be understood that other hard and tough metals having a melting point higher than that of the body metal presently employed may be used for providing valve inserts and seat rings in accordance with the invention, for the reason that, as will hereinafter appear, the method of the invention includes a mechanical step of bonding the body metal with the seat ring or insert.

The invention resides in a valve body or other valve part having a wear-resisting seat ring or insert, and in a method of applying a valve seat ring or insert to a valve body or other valve part of a metal dissimilar to that of the ring or insert, such method including the steps of uniting the seat ring or insert with the valve body or other valve part preferably by casting the metal of the valve body or other valve part around the seat ring or insert and, thereafter, upon cooling of the casting, rolling, peening, expanding, swaging or otherwise pressing or compacting the metal of the valve body or other valve part into intimate, rigid, fluid-tight association with the seat ring or insert, the seat ring or insert preferably being provided, upon its surfaces normally contacting the metal of the valve body or other valve part, with appropriate markings, apertures, or other contoural characteristics serving to furnish a relatively rigid union with the metal of the valve body or other valve part, all as will be explained hereinafter more fully and finally claimed.

In the accompanying drawings illustrating the invention, in the several figures of which like parts are similarly designated, Figure 1 is a sectional elevation of a gate valve of known type, provided with seat rings in accordance with the invention.

Fig. 2 is an axial sectional view of a composite core with seat rings appropriately carried thereby in position for casting in the valve body of Fig. 1 in a suitable mold.

Fig. 3 is a fragmentary sectional elevation of the finished body casting, and illustrating the step of compacting the metal of the valve body into intimate union with its seat rings.

Fig. 4 is an end view of one appropriate form of compacting tool, such as that illustrated in Fig. 3.

Fig. 5 is an axial sectional elevation of the tool illustrated in Figs. 3 and 4.

Figs. 6, 7 and 8 are, respectively, a diametrical section, a face view, and a back view of a seat ring somewhat modified from that illustrated in Figs. 1, 2 and 3.

Fig. 9 illustrates a still further modified form of seat ring associated with a valve body in accordance with the invention, and it shows also a valve gate as a part embodying the invention.

Fig. 10 is a fragmentary sectional view illustrating a preferred mode of compacting or swaging the metal of the valve body into intimate union with a seat ring of the type illustrated in Fig. 9, and an appropriate tool for performing this operation.

Fig. 11 is a sectional elevation illustrating the invention in its application to a globe valve, and Fig. 12 illustrates the finished globe valve casting prior to the compacting or swaging operation.

As illustrated in Fig. 1, the valve to which the seat rings may be applied in accordance with the invention, comprises the usual body 1, bonnet 2, stem 3 with handle or wheel 4, and a gate 5 connected in any usual or approved manner with the end 6 of the stem 3. This gate 5 cooperates with the face 7 of opposed seat rings 8, 8' to open and close the ports 9, 9' of the body provided with the usual extensions 10, 10' screw-threaded, as indicated, to receive complementally screw-threaded pipe ends.

The seat rings 8, 8' are, as shown, similar in all respects and include, in addition to their annular face portions 7, axially arranged casting projections preferably in the form of shanks or sleeves 11 offset from the outer and inner peripheral edges of the face portions 7, and these shanks or sleeves preferably have their inner annular surfaces provided with appropriate annular grooves 12 or the like.

Referring particularly to Fig. 2, it will be seen that the seat rings 8 and 8' are mounted upon the central portion 13 of the composite body forming core, and that the portions 14, 14' of this core, which provide in the casting the valve ports in the valve body, closely fit within the inner annular edges of the face portions of the seat rings. Moreover, the core members 14 and 14' are provided, in alignment with the shanks or sleeves 11 of the seat rings, with annular grooves 15. Thus, when the core with the seat rings assembled thereon is positioned in a mold, and the metal of the valve body, for example brass, is poured into the mold, it will embrace all portions of the composite core 13, 14, 14' and will embrace, also, the shanks or sleeves 11 of the seat rings and will fill the grooves 12 therein, and it will also fill the grooves 15 of the core members 14, 14'. Hence, when the casting is removed from the mold, the seat rings will, in a sense, constitute integral parts of it, and the metal of the body will extend up to the backs of the face portions 7 of the seat rings upon both the inner and the outer surfaces of the shanks or sleeves 11, as shown in Fig. 3. Moreover, there will be provided in each port opening of the valve body an excess of the body metal, preferably as an annular rib or bead 16 formed by the metal which flowed into the grooves 15 of the core members 14, 14', during the casting operation.

Although the operation of casting the valve body with the seat rings located therein by the core will produce an intimate union and assembly of the seat rings in the body, it has been found in practice, probably due to the dissimilarity in physical characteristics of the relatively hard metal of which the seat rings are formed and the relatively soft metal from which the body is cast, that upon cooling of the casting there is apt to be some separation between the seat rings and the parts of the body in contact therewith. Although such separation may, theoretically, be negligible, it is apt to be responsible for faulty operation of the valve, in that the seat rings may move out of predetermined appropriate alignment, may rotate or otherwise alter their positions slightly with respect to the body, or leakage may occur around them.

In order to eliminate these possible faults the metal of the body in engagement with the shanks or sleeves of the seat rings may be pressed or compacted against the seat rings and their shanks and thus caused more intimately to engage them. This may be accomplished by a rolling, peening, swaging or other pressing or compacting operation conducted upon that metal of the body which ultimately constitutes the valve ports. The excess metal furnished within the port openings, and preferably constituted by the annular ribs or beads 16, functions to supply such additional metal as may be needed, during the pressing or compacting operation, to eliminate any voids incident to casting and to be displaced into and in intimate engagement with the annular grooves 12 of the shanks or sleeves 11 of the seat rings, and against the backs of the face portions 7 thereof, thus providing a fluid-tight rigid anchorage between the seat rings and the body.

Any appropriate tool may be employed for this pressing or compacting operation, and the tool illustrated in Figs. 3, 4 and 5 has been found to be suitable. This tool preferably comprises a mandrel 17 carrying a sleeve 18 in which are journalled a plurality of rollers 19 and having an appropriately located stop shoulder member 20. It will be understood that either the sleeve 18 with its rollers 19 may be rotated with respect to the valve body, or the sleeve may be held stationary and the valve body rotated with respect to the rollers carried by the sleeve. In any event, the sleeve with its carrying mandrel may be inserted into the valve body through one of the ports thereof, as illustrated in Fig. 3, until the appropriately located stop shoulder member 20 abuts against the face of the adjacent extension 10, thus locating the rollers 19 adjacent to that portion of the port opening contiguous to the shank or sleeve 11 of the respective seat ring. With pressure radially applied between the rollers 19 and the adjacent metal of the port opening, it will be apparent that relative rotation between the valve body and the sleeve 18 in the port opening will cause the metal of the bead or rib 16 to flow and thereby be displaced, and that upon continuation of the rolling and pressure applying process a similar operation will be conducted upon all of the metal of the port opening in contact with the rollers 19 to the end that this metal is compacted, pressed or swaged into intimate engagement with adjacent and embraced portions of the seat ring.

Furthermore, this compacting operation will produce a smooth, even, cylindrical port opening or bore substantially annularly contiguous to the internal circumference of the face portion of the seat ring, thus providing a smooth passageway for fluid passing through the valve.

As intimated, tools other than that particularly illustrated may be employed for performing the compacting operation. An expansive mandrel might be expanded within the port opening while either it or the valve body is rotated, or a tapered mandrel might be forced axially into the port opening while either it or the valve body is rotated, or a hammering tool might be effectively used.

Obviously, after the pressing or compacting operation is performed with reference to both seat rings, the faces 7 thereof, and other parts of the valve, may be appropriately machined as required.

Instead of relying solely upon the casting and pressing or compacting operations, in combination with the annular grooves 12, to non-rotatively unite and anchor the seat rings within the valve body, the seat rings may, as illustrated in Figs. 6, 7 and 8, have their shanks or sleeves 11 provided with radial bores or openings 21 into and through which the body metal may flow during the casting operation, thus providing a mechanical bond between the seat rings and the body, in addition to the bond furnished by the pressing or compacting operation.

As illustrated in Figs. 9 and 10, the seat rings may be provided with casting projections formed as annular flanges 22 around which the metal of the body flows during the casting operation, and this metal may be appropriately pressed or compacted into intimate engagement with the flanges 22 by a rolling, peening, or other pressing or compacting operation to provide an unalterable fluid-tight union between the seat rings and the body.

An appropriate tool for performing the peening operation last referred to is illustrated in Fig. 10. This tool may comprise a plate 23 having a socket member 24 upon its back and a plurality of peen heads 25 upon its face. This member may be dropped into the valve body through the gate opening therein with its peen heads 25 appropriately located with respect to the adjacent wall of the valve body in engagement with the flange of the respective seat ring, and its socket 24 thereafter engaged by a pressure bar 26 passed through the opposite port opening of the valve. The pressure bar 26 may then be hammered and rotated, or may otherwise have pressure applied to it while being rotated, and this hammering or application of pressure will be communicated through the peen heads 25 while the plate 23 is rotated, to peen the metal of the body into desired intimate fluid-tight engagement with the flange 22.

It will readily be appreciated that seat rings of the type illustrated in Figs. 9 and 10 may, if desired, be so treated by drilling, scoring or otherwise roughening their surfaces as to provide for their mechanical bonding with the body metal.

The gate member 27 of Fig. 9 may be of composite structure including a hard or tough metal head 28 and a soft metal shank 29 cast thereon and interlocked therewith by extensions 30 and peened or rolled, in a manner obvious from the foregoing disclosure, so that intimate mechanical and fluid-tight engagement will be afforded between the head and shank. This type of gate member lends itself readily to gate valves of the non-rising stem type, such as that illustrated in Fig. 9, in that the machining of a screw-thread in the shank 29, complemental to the screw-thread 31 of the non-rising stem 32 may easily be accomplished in the soft metal of the shank, whereas machining difficulties would arise were the shank 29 formed of the same hard or tough metal as the head 28, and wear upon the screw-thread of the stem might result.

As illustrated in Figs. 11 and 12, seat rings 33 having substantially the same assembly characteristics as those hereinbefore referred to with respect to Figs. 1 to 8, and 9 and 10, if desired, may be employed in globe valves 34 as well as in gate valves, and the method of casting them integral with globe valve bodies 35, and of compacting the metal of such bodies into intimate fluid-tight union with them, may be accomplished, substantially in accordance with the methods referred to.

As hereinbefore mentioned, Monel metal has been found to be especially appropriate for the manufacture of seat rings such as those referred to, or for gate heads such as that illustrated in Fig. 9, in that its physical characteristics make possible its inclusion in the mold during the casting operation, and in the resultant casting, without likelihood of undue relative shrinkage or expansion and, moreover, with the advantage that, although its hardness and toughness characteristics may somewhat deteriorate in the presence of the hot metal of the body during the casting operation, they will again harden as the casting is slowly cooled. Moreover, such heat treatment of this alloy as may be necessary to adapt it to necessary machining operations may be accomplished without injury to the valve casting in which it is included as a unitary part. However, other hard tough metals or alloys may be used effectively in view of the intimate bond produced by the pressing or compacting operation.

Various changes or modifications are considered to be within the spirit of the invention and the scope of the following claims.

What I claim is:

1. A method of applying a metallic seat ring to a metallic valve body, comprising appropriately supporting the seat ring upon a core member and thereby positioning it within a casting mold, said core provided adjacent to said ring with means to receive metal in excess of that normally required for the body, pouring the molten metal of the valve body into the mold to fill the same and embrace said seat ring and to fill said excess-receiving means, permitting the casting to cool, and thereafter pressing the metal of the body adjacent to the seat ring, including said excess metal, into intimate engagement with said ring.

2. A method of applying a metallic seat ring to a metallic valve body, comprising appropriately supporting the seat ring upon a core member and thereby positioning it within a casting mold, said core provided adjacent to said ring with an annular groove serving to produce in the finished casting an annular bead, pouring the molten metal of the valve body into the mold to fill the same and embrace said seat ring and to fill said groove, permitting the casting to cool, and thereafter pressing the metal of the body adjacent to the seat ring, including the metal of said bead, into intimate engagement with said ring.

3. A method of applying a metallic seat ring to a metallic valve body, said seat ring including an annular shank, comprising appropriately supporting the seat ring upon a core member and thereby positioning it within a casting mold, said core member provided adjacent to the shank of said ring with an annular groove serving to produce in the finished casting an annular bead, pouring the molten metal of the valve body into the mold to fill the same and embrace said seat ring and to fill said groove, permitting the casting to cool, and thereafter pressing the metal of the body adjacent to the shank of the seat ring, including the metal of said bead, into intimate engagement with said ring.

4. A method of applying a metallic seat ring to a metallic valve body, said seat ring including an annular shank having surface markings serving to provide interlocking engagement between the ring and the metal of the body, comprising appropriately supporting the seat ring upon a core member and thereby positioning it within a casting mold, said core member provided adjacent to the shank of said ring with an annular groove serving to produce in the finished casting an annular bead, pouring the molten metal of the valve body into the mold to fill the same and embrace said seat ring and to fill said groove, permitting the casting to cool, and thereafter pressing the metal of the body adjacent to the shank of the seat ring, including the metal of said bead, into intimate engagement with said ring and the surface markings of the shank thereof.

5. A method of producing a valve body provided with a valve seat ring at its fluid passage, including the steps of forming said seat ring with a casting projection, appropriately positioning the seat ring in a casting mold, casting the metal of the body interiorly and exteriorly of said casting projection, whereby the seat ring is included in the body casting as a substantially unitary part thereof, permitting the casting to cool, and thereafter compressing the metal of the body adjacent to the casting projection of the seat ring into intimate engagement therewith.

6. A method of producing a relatively soft metal valve body provided with a relatively hard metal valve seat ring at its fluid passage, including the steps of forming said seat ring with a casting projection, appropriately positioning the seat ring in a casting mold, casting the metal of the body interiorly and exteriorly of said casting projection, whereby the seat ring is included in the body casting as a substantially unitary part thereof, permitting the casting to cool, and thereafter compressing the metal of the body adjacent to the casting projection of the seat ring into intimate engagement therewith.

7. A method of producing a valve body provided with a valve seat ring at its fluid passage, including the steps of forming said seat ring with a casting projection, appropriately positioning the seat ring in a casting mold, casting the metal of the body interiorly and exteriorly of said casting projection, whereby the seat ring is included in the body casting as a substantially unitary part thereof, permitting the casting to cool, and thereafter rolling the metal of the body adjacent to the casting projection of the seat ring to press such metal into intimate engagement therewith.

8. In a valve, a cast valve body formed of relatively soft metal, and a seat ring preformed of relatively hard metal and united with said body during the casting of same, said ring being arranged in appropriate relation to a fluid passage of said body and having offstanding shank means extending into the wall surrounding the fluid passage, said wall as cast providing metal in excess of that normally required to form said fluid passage, and the metal of said wall including said excess being mechanically compressed into intimate engagement with said shank means.

9. In a valve, a cast valve body formed of relatively soft metal, and a seat ring preformed of relatively hard metal and united with said body during the casting of same, said ring being arranged in appropriate relation to a fluid passage of said body and having offstanding shank means extending into the wall surrounding the fluid passage, said shank means being embraced interiorly and exteriorly by said wall, said wall as cast providing metal in excess of that normally required to form said fluid passage, and the metal of said wall including said excess being mechanically compressed into intimate engagement with said shank means.

HENRY C. LE BEAU, Jr.